Sept. 18, 1951  W. F. ANDERSON  2,568,602
BAIT HOLDER
Filed May 14, 1946
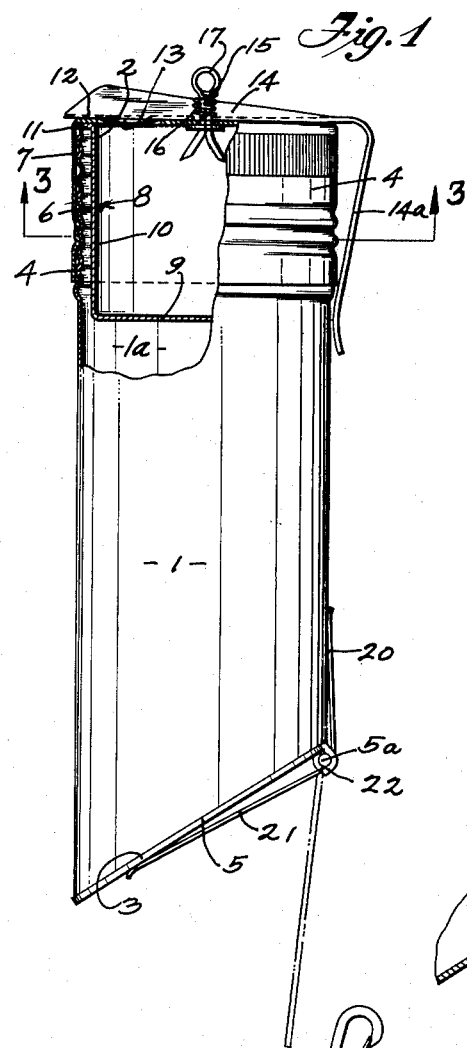
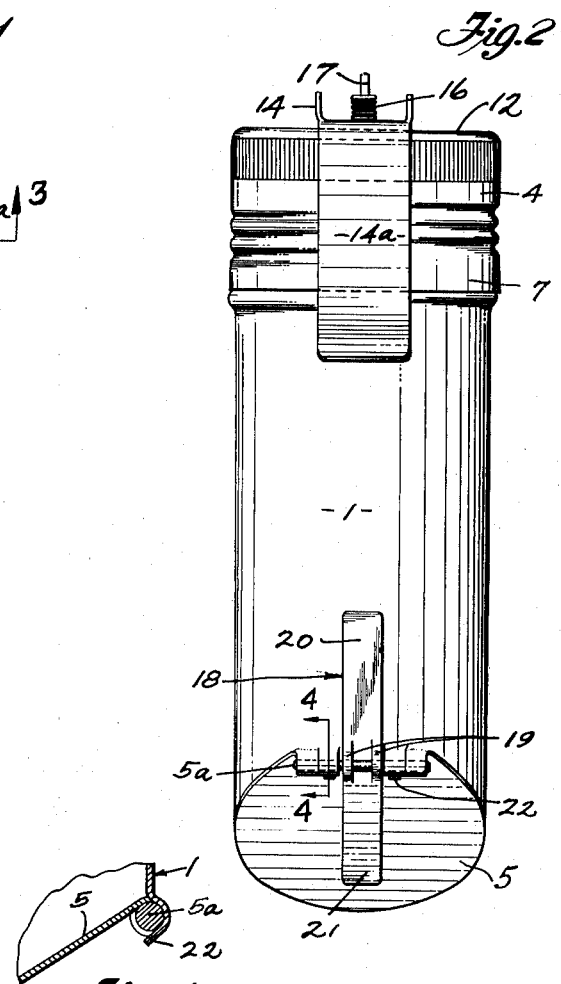
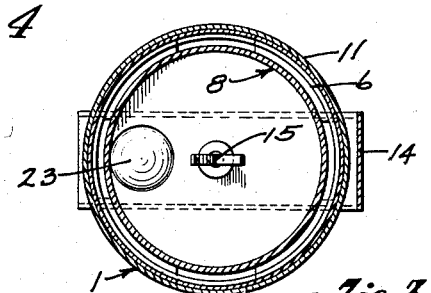
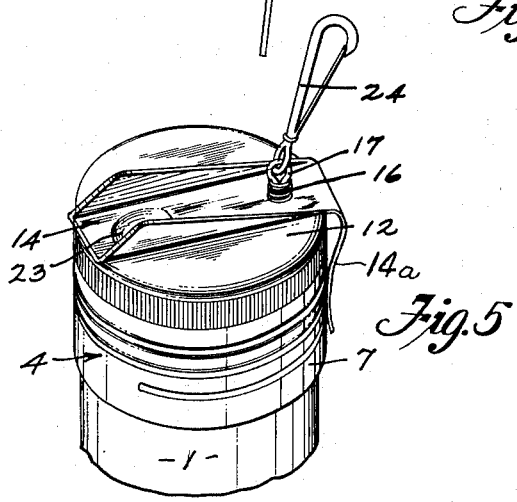
INVENTOR.
WILLIAM F. ANDERSON
BY
*Attorney*

Patented Sept. 18, 1951

2,568,602

UNITED STATES PATENT OFFICE 2,568,602

BAIT HOLDER

William F. Anderson, Wilmington, Calif.

Application May 14, 1946, Serial No. 669,678

3 Claims. (Cl. 43—55)

This invention relates to holders for fishing bait and an object is to provide a receptacle of convenient size and light weight, which is formed with separate receptacles adapated to contain different kinds of bait having widely different characteristics, such as worms, grubs, or salmon eggs. The holder is so arranged that one receptacle may be opened for removing bait therefrom while the other receptacle remains closed.

Generally, I prefer to provide a holder for the hereinbefore mentioned purpose which is of tubular cross section and usually cylindrical so that a suitable cuplike receptacle may be removably held in an end portion of the body for holding one kind of bait while the remaining portion of the body may contain a bait of different character.

It is an object, also, to provide a holder of tubular cross section having separate and different types of closures for opposite ends thereof adapted to dispense the particular kind of bait retained thereby.

Another object is to provide a closure for one of the receptacles, as for instance, in which salmon eggs or other bait of a granular nature is contained and which has an outlet through which the eggs may be dispensed one or more at a time, but which outlet is closable for excluding air and thereby preventing deterioration of the bait.

A further object is to provide a tensioned closure for another receptacle of the holder, which may contain worms whereby a single worm may be removed when desired and even severed by the closure if less than a full length worm is desired to be used.

Still other objects may appear as the description of my invention progresses.

I have shown a preferred form of bait holder embodying my improvements in the accompanying drawing, in which:

Fig. 1 is a side elevation partly in section;

Fig. 2 is an elevation as seen in a plane at right angles to Fig. 1;

Fig. 3 is a sectional plan on line 3—3 of Fig. 1;

Fig. 4 is a fragmentary sectional view on the line 4—4 in Fig. 2 of the lower closure and body illustrated in Fig. 1; and Fig. 5 is a partial perspective view of the complete holder shown in Figs. 1 and 2 wherein the closure pivoting means is disposed eccentrically instead of centrally as in Figs. 1 and 2.

Briefly described, my bait holder includes a tubular body 1 (perferably of cylindrical cross section) which has an opening 2 at its top and an opening 3 at its bottom adapted to be normally closed, respectively, by a cap 4 and a flap 5. The upper portion of the body may be threaded, as at 6, to removably receive the skirt 7 of cap 4 (Fig. 1) for not only closing opening 2, but also for securing a cuplike receptacle 8 in position on the holder.

Receptacle 8 has a bottom 9, a wall 10 and a flange 11 adapted to overlie the upper edge of body 1, so that when the top 12 of cap 4 is attached to body 1 the receptacle 8 will be operatively held on the body and top 12 will close the respective upper ends of the receptacle and the body 1.

Top 12 of the cap has an oulet 13 therein through which fish eggs or other bait may be discharged, as when the body is tilted or upended, and said outlet is normally closed as by means of member 14, which is pivoted at 15 in the center as shown in Fig. 1 or eccentrically as shown in Fig. 5 on the cap. Member 14 may be provided with a tensioned arm 14a bent downwardly over the periphery of the body or cap or both, as shown in Figs. 1 and 2, for holding member 14 in open or closed position. Hinge 15 may have a spring 16 between top 12 of the cap and the eye 17 of a cotter pin for the purpose of frictionally holding the web of member 14 against the cap, so as to seal the outlet 13 when desired. Obviously, by merely rotating member 14 to a slight extent, the outlet 13 may be opened or closed.

Body 1 has a receptacle 1a, which is closed at the top by bottom 9 of the receptacle 8 and at its bottom by flap 5. Said flap is hinged at 5a to the body 1 and is tensioned by means of a spring 18 having portions 19 secured to hinge pintle 5a and upper and lower portions 20 and 21, respectively, adapted to overlie the periphery of the body 1 and flap 5, as shown in Figs. 1 and 2. Thus, the flap is held in normally closed position, but may be opened for removing bait from receptacle 1a at will. The extent to which the flap may be opened may be limited as by means of a stop 22 bent from the wall of the body (Fig. 4).

Member 14 may have an indented portion 23 so formed and positioned as to seat in outlet 13 of the cap and, thus, hold receptacle 8 closed normally.

My holder may be conveniently carried by a fisherman on his belt or creel and supported, as shown in Fig. 5, by a snap clasp 24 attached to eyelet 17 or otherwise.

In use, for instance, fish eggs may be removed from receptacle 8 by merely turning member 14 slightly and up-ending the holder, while worms or other types of bait may be removed from receptacle 1a by opening flap 5. If less than a full length worm is desired, the sudden release of the flap, under tension of spring 18, will sever the worm at a desired point.

I claim:

1. A bait holder comprising a tubular body forming a main receptacle and adapted to contain bait, a tensioned closure for the bottom of said holder, a second receptacle mounted in the upper end of said main receptacle for holding bait of different character from that in the main receptacle, a cap removably secured to the upper end of the tubular body for retaining the bait in the second receptacle, said cap having an outlet therein through which bait therefrom may be removed and a second closure tensioned and pivotally movable on said cap for opening and closing said outlet, thereby permitting independent removal of the bait from one receptacle without removing bait from the other receptacle.

2. A bait holder comprising a tubular body forming a main receptacle and adapted to contain bait, a tensioned closure for the bottom of said holder, a second receptacle mounted in the upper end of said main receptacle for holding bait of different character from that in the main receptacle, a cap removably secured to the upper end of the tubular body for retaining the bait in the second receptacle, said cap having an outlet therein through which bait therefrom may be removed and a second closure tensioned and pivotally movable on said cap for opening and closing said outlet, thereby permitting independent removal of the bait from one receptacle without removing bait from the other receptacle, said second closure being formed with a portion bent outwardly from the plane thereof and adapted to seat over said outlet.

3. A bait holder comprising a tubular body forming a main receptacle and adapted to contain bait, a tensioned closure for the bottom of said holder, a second receptacle mounted in the upper end of said main receptacle for holding bait of different character from that in the main receptacle, a cap removably secured to the upper end of the tubular body for retaining the bait in the second receptacle, said cap having an outlet therein through which bait therefrom may be removed and a second closure tensioned and pivotally movable on said cap for opening and closing said outlet, thereby permitting independent removal of the bait from one receptacle without removing bait from the other receptacle, the bottom of said tubular body being inclined diametrically of the body and said bottom closure being hinged to the body at the top of such incline and formed with a flap underlying the main receptacle.

WILLIAM F. ANDERSON.

REFERENCES CITED

The following references are of record in the file of this patent:

UNITED STATES PATENTS

| Number | Name | Date |
| --- | --- | --- |
| 169,029 | Nauen | Oct. 19, 1875 |
| 475,977 | Dillingham | May 31, 1892 |
| 832,168 | Schopflocher | Oct. 2, 1906 |
| 1,508,894 | Morrison | Sept. 16, 1924 |
| 1,879,858 | Schroedter | Sept. 27, 1932 |
| 1,998,373 | Love | Apr. 16, 1935 |
| 2,072,630 | Ferry | Mar. 2, 1937 |
| 2,160,436 | Jones | May 30, 1939 |
| 2,352,951 | Geria | July 4, 1944 |
| 2,396,932 | Slaton et al. | Mar. 19, 1946 |